United States Patent
Forbes, Jr.

(10) Patent No.: US 6,512,916 B1
(45) Date of Patent: Jan. 28, 2003

(54) METHOD FOR SELECTING MARKETS IN WHICH TO DEPLOY FIXED WIRELESS COMMUNICATION SYSTEMS

(75) Inventor: Joseph W. Forbes, Jr., Suwanne, GA (US)

(73) Assignee: America Connect, Inc., Alpharetta, GA (US)

(*) Notice: Subject to any disclaimer, the term of this patent is extended or adjusted under 35 U.S.C. 154(b) by 377 days.

(21) Appl. No.: 09/635,941

(22) Filed: Aug. 10, 2000

Related U.S. Application Data (60) Provisional application No. 60/184,733, filed on Feb. 23, 2000.

(51) Int. Cl.$^7$ .............................................. H04B 17/00
(52) U.S. Cl. ........................ 455/67.6; 455/423; 455/3.01
(58) Field of Search .................................. 455/423, 67.1, 455/67.6, 422, 424, 517, 446, 3.01, 554, 555

(56) References Cited

U.S. PATENT DOCUMENTS

| | | | |
|---|---|---|---|
| 6,085,176 A | * 7/2000 | Woolston | ...................... 705/16 |
| 6,098,048 A | * 8/2000 | Dashefsky et al. | ......... 340/438 |
| 6,111,857 A | * 8/2000 | Soliman et al. | ............. 370/254 |

* cited by examiner

*Primary Examiner*—Thanh Cong Le
*Assistant Examiner*—Tan Trinh
(74) *Attorney, Agent, or Firm*—Holland & Knight LLP (57) ABSTRACT

A method for selecting geographic areas or markets in which to deploy fixed wireless communication systems (100) is preferably accomplished by selecting only markets in which the populations rank between approximately the twentieth and the eightieth percentiles of a country's regional populations ranked in increasing order to produce a first set of selected markets. Markets in the first set are further refined by selecting only those markets in the first set that have population centers within a predetermined distance of population centers of regions. The markets in the second set are further limited by selecting only those markets of the second set in which the most populated city in the market is within a predetermined distance of an existing microwave transceiver site. The third set of markets is further restricted by selecting only those markets in which the per capita personal income is greater than a threshold to produce the desired markets in which to deploy the systems.

25 Claims, 3 Drawing Sheets

METHOD FOR SELECTING MARKETS IN WHICH TO DEPLOY FIXED WIRELESS COMMUNICATION SYSTEMS

CROSS-REFERENCE TO RELATED APPLICATIONS

Priority is hereby claimed under 35 U.S.C. §119(e) to co-pending, commonly-assigned U.S. Provisional Patent Application Ser. No. 60/184,733, filed Feb. 23, 2000 and entitled "Fixed Wireless Communication System and Method for Selecting Markets in Which to Deploy Same", which application is expressly incorporated herein by preference in its entirety to form part of the present disclosure.

FIELD OF THE INVENTION

The present invention relates generally to fixed wireless communication systems and, in particular, to a method for selecting geographic areas in which to deploy fixed wireless communication systems.

BACKGROUND OF THE INVENTION

The Telecommunications Act of 1996 deregulated local telephone service, thereby enabling new service providers, such as competitive local exchange carriers (CLECs), to compete with local telephone companies to install, lease, and/or resell unbundled loop or switch access services to customers. As a result of the Act, CLECs have the opportunity to compete with local exchange carriers (LECs or local telephone companies) and alternative service providers, such as commercial mobile radio service (CMRS) providers, in offering customers access to the public switched telephone network (PSTN). Internet service providers (ISPs) may also become CLECs in order to meet competitive pressure to reduce Internet access rates. With the continually increasing popularity of the Internet and the trend for ISPs to also provide CLEC services (or CLECs to provide Internet access services), existing and potential customers are demanding more features and bandwidth from the carriers of Internet traffic. A major portion of such demand is for Internet access to owners of rural businesses and residences.

The net effect of the convergence of voice and the Internet is competition between LECs to provide a complete voice and data communications solutions to rural businesses and residences. Such competition can exist only if CLECs or CMRS providers can efficiently design networks that meet or exceed voice and data service specifications of current LEC networks.

Although certain types of high speed (i.e., greater than 56 kilobits per second (kbps)) Internet service, such as integrated digital services network (ISDN), asymmetric digital subscriber lines (ADSL) and/or DSL, are alleged to be provided or forthcoming in some low populous or rural markets (i.e., with populations of less than approximately 165,000 persons), such service is either inferior or has yet to be implemented due to the substantial distance (e.g., twenty-five miles or more) of the markets from the central serving offices of the service providers. These low populous or lower tier markets (e.g., cities and counties) often include educated and successful segments of the population desirous of an alternative to traditional low speed, dial-up methods of Internet access. The combination of the lack of CLECs and DSL providers, and the poor service offered by the existing LECs serving these lower tier markets provides market opportunity for new broadband service providers.

Fixed wireless networks (FWNs), such as wireless local loops (WLLs), are an efficient means for providing access to the PSTN or the Internet in rural or low populous areas. Such networks include a wireless infrastructure, such as base transceiver sites (BTSs), and wireline switching equipment within a so-called local access and transport area (LATA). An LATA is a geographic area served by one or more LECs and in which access to the PSTN is provided via a PSTN access switch, such as a conventional local access tandem switch. The BTSs are connected to localized switching equipment via leased high speed lines (e.g., where the FWN provider is also the LEC) or via microwave links. The localized switching equipment is then connected to the PSTN through the PSTN access switch.

In existing WLL networks, a remote wireless transceiver and antenna system is attached to the outside of a residence or business and connected to the telephone lines located within the building. A call emanating from a subscriber within the residence or business is communicated through the in-building telephone lines to the remote wireless transceiver, which in turn communicates the call to a BTS via a wireless communication resource or channel. The BTS forwards the call to the localized switching equipment. The switching equipment then routes the call to the appropriate PSTN or WLL subscriber (when the target subscriber is within the LATA) or to the calling subscriber's interexchange carrier (IXC) for long distance service. Thus, WLL networks are coupled to the PSTN and IXCs via localized switching in a manner similar to conventional telephone networks. Existing WLLs are currently limited to providing local exchange services (i.e., local and long-distance telephone services), although wireless technology exists to support both voice and data.

Although WLL technology is a means for providing telephone and data services to low populous areas, existing approaches to implementing FWNs are time-consuming and costly due in large part to the costs and time required to deploy localized switching equipment in each LATA. The increased time and cost associated with deploying localized switching equipment delay the offering of broadband services to low populous areas and make competing with existing LECs difficult. In addition, although all rural areas would ultimately enjoy broadband services, especially high speed Internet access, delivery to all such areas or markets may be limited by the lack of available wireline infrastructure. Thus, only certain lower tier markets are practical candidates for rapid deployment of broadband FWN systems. However, no method currently exists for selecting which low populous markets are good, practical candidates.

Therefore, a need exists for a method of selecting low populous markets in which to deploy fixed wireless communication systems, wherein such markets support rapid deployment of such systems.

SUMMARY OF THE INVENTION

Generally, the present invention encompasses a method for selecting geographic areas in which to deploy fixed wireless communication systems. A fixed wireless communication system includes wireless subsystems connected via microwave links to a backbone network comprising a particular arrangement of points of presence (POPs), points of interface (POIs), regional switching centers, and router subsystems that connect the wireless subsystems to the public switched telephone network (PSTN) and/or the Internet (e.g., via an Internet backbone system, such as the "UUNET" backbone system which is commercially available from UUNET Technologies, Inc. of Fairfax, Va.). Fiber optic transmission lines are preferably used to transport voice, data, and/or video from POIs to POPs to switching centers, and vice versa. Importantly, the backbone network does not utilize localized switching in each local access and transport area (LATA) to couple the wireless subsystems to the PSTN. Rather, the present invention utilizes existing POPs and POIs, and unique regional switching to hub several LATAs, thereby substantially reducing infrastructure costs and expediting deployment of the system in appropriately selected, low populous markets.

Since the fixed wireless communication system to be deployed in accordance with the present invention takes advantage of at least some existing wireline infrastructure, the method for selecting low populous geographic areas or markets in which to deploy such a system is at least partially dependent on the availability of such infrastructure. In particular, market selection is accomplished in accordance with one aspect of the present invention by first selecting only markets in which the populations rank between approximately the twentieth and the eightieth percentiles (also known as lower tier markets) of a country's regional populations ranked in increasing order to produce a first set of selected markets. Next, the markets in the first set are further refined by selecting only those markets in the first set that have population centers within a predetermined distance (e.g., approximately one hundred twenty (120) kilometers or seventy-five (75) miles) of population centers of regions (e.g., county or other equivalent government-established region) having populations greater than the eightieth percentile of the country's regional populations ranked in increasing order to produce a second set of selected markets. The markets in the second set are further limited by selecting only those markets of the second set in which the most populated city in the market is within a predetermined distance (e.g., approximately forty (40) kilometers or twenty-five (25) miles) of an existing microwave transceiver site (MTS) or fiber POP to produce a third set of markets. Finally, the third set of markets is further restricted by selecting only those markets in which the per capita personal income (PCPI) is greater than a defined threshold (e.g., $20,000) to produce the desired markets in which to deploy the system.

If the resulting desired set of markets is too large, the set may be further restricted in accordance with another aspect of the present invention by selecting markets in which the household density is greater than a threshold (e.g., 150 households per square kilometer), by selecting markets in which a threshold number (e.g., three or more) of state roadways or federal highways pass through at least a portion of the market, by taking into consideration wireless frequency spectrum availability (or lack thereof) in the markets for the wireless portion of the system, and/or by taking into account other considerations, such as existing broadband competition (or lack thereof) in the markets.

By selecting geographic areas in which to deploy fixed wireless communication systems in this manner, the present invention enables new broadband service providers to rapidly enter the broadband service market and become providers of local exchange primary line subscriber service, high speed Internet access, and/or long distance service (via connection to an IXC) without substantial wireline infrastructure investment and deployment. The present invention also provides a means for filling the void in broadband service that currently exists in lower tier markets (i.e., markets with populations of less than about 165,000 persons) left by competitive local exchange carriers (CLECs) and Internet Service Providers (ISPs).

Other objects, advantages and novel features of the invention will become more apparent from the following detailed description when taken in conjunction with the accompanying drawings.

DETAILED DESCRIPTION OF A PREFERRED EMBODIMENT

Figure 1:
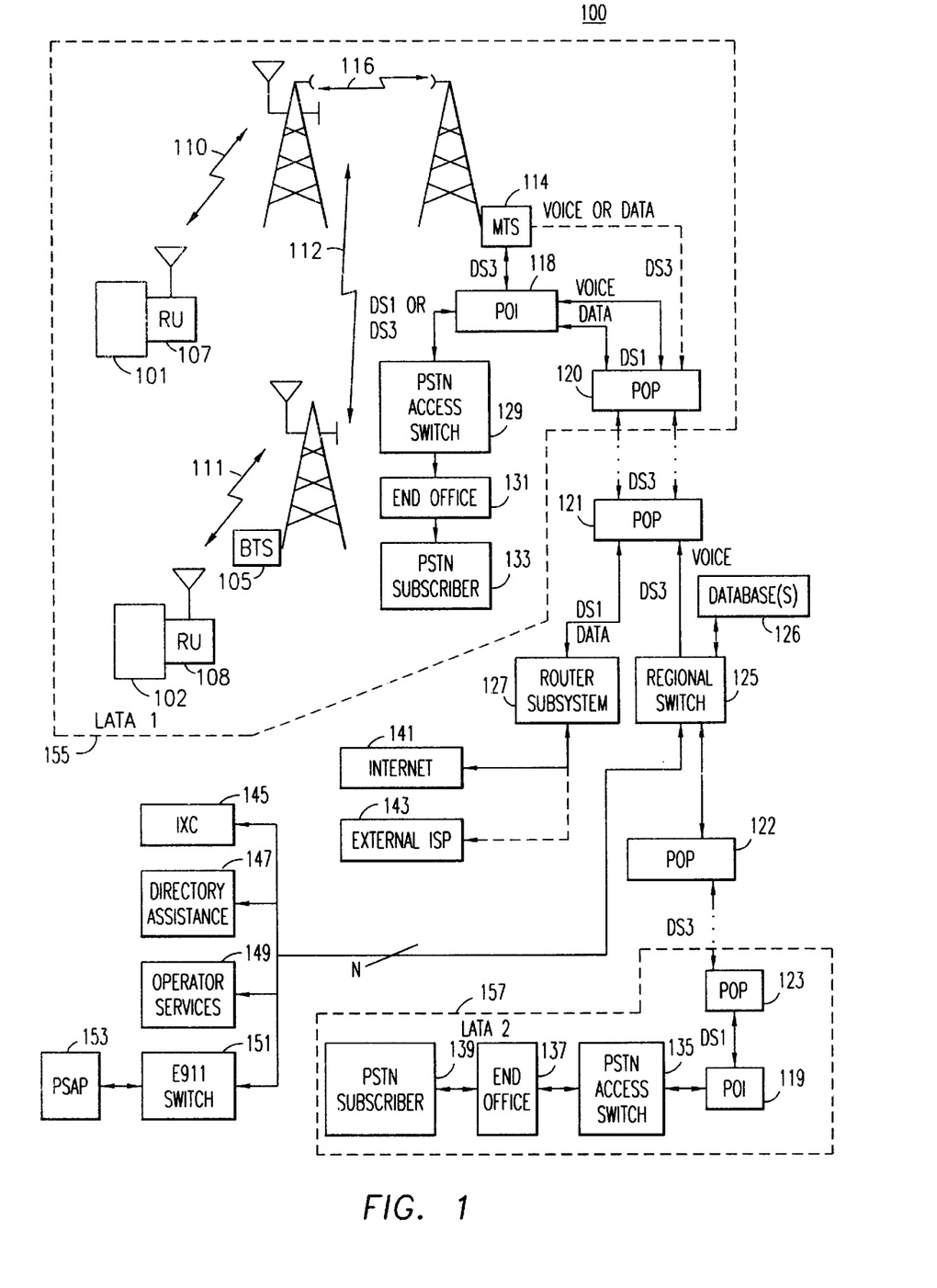
FIG. 1 is a block diagram of an exemplary fixed wireless communication system in accordance with a preferred embodiment of the present invention.
Figure 2:
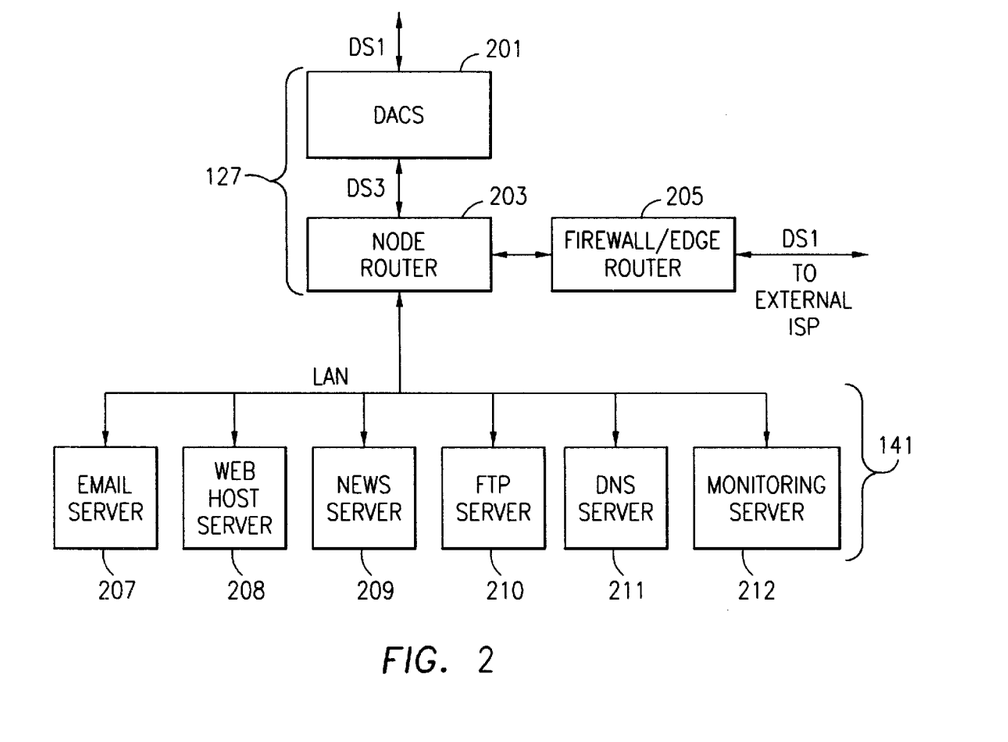
FIG. 2 is an electrical block diagram of a router subsystem incorporated in the communication system of FIG. 1.
Figure 3:
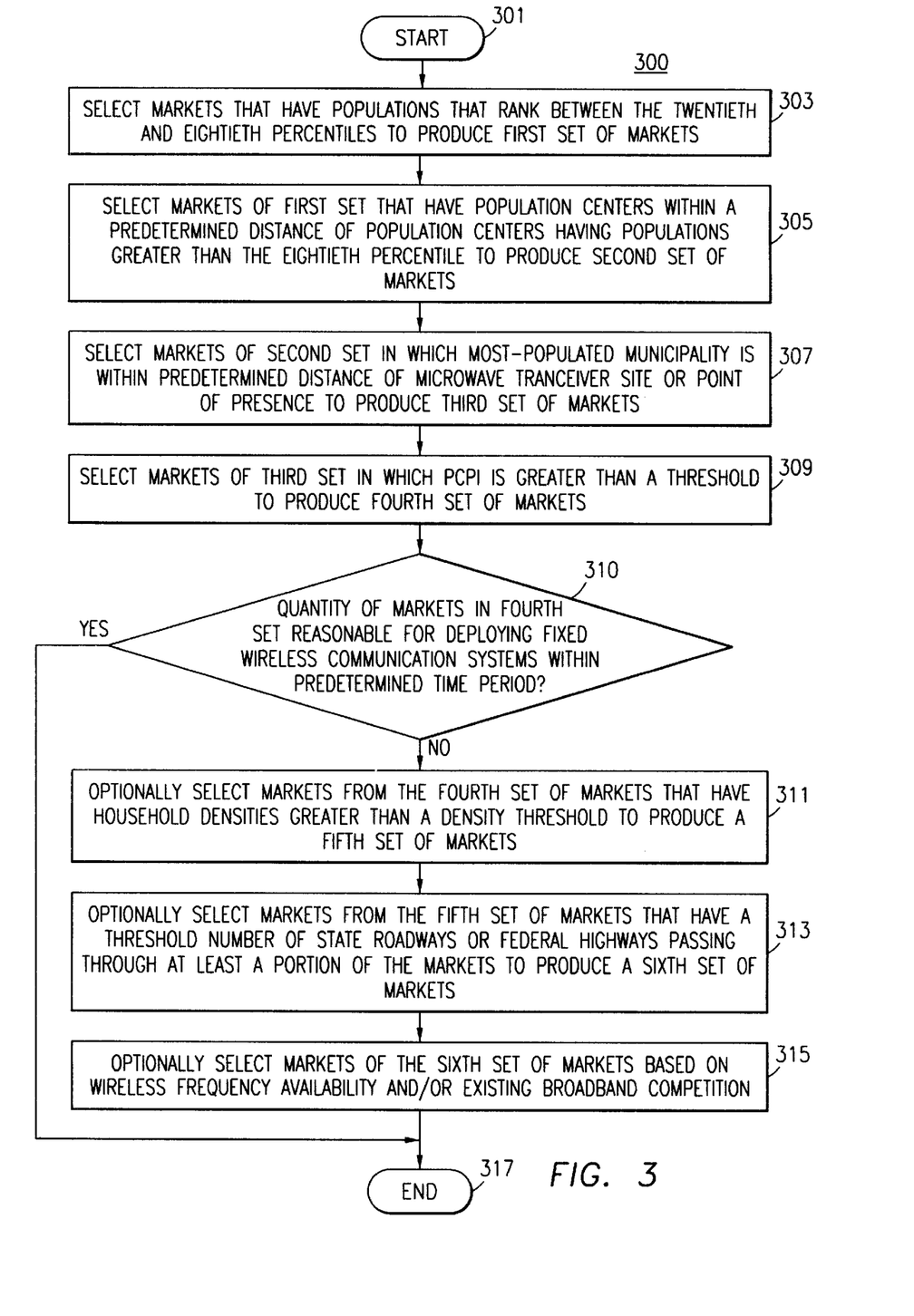
FIG. 3 is a logic flow diagram of steps executed to select markets for deploying fixed wireless communication systems in accordance with the present invention.

The present invention can be more fully understood with reference to FIGS. 1–3, in which like reference numerals designate like items. The general topology of the network is to use a wireless subsystem, such as a wireless local loop (WLL) subsystem, to provide the so-called "last mile" of service, point-to-point microwave from the wireless subsystem to the backbone network, and a unique arrangement of POIs, POPs, switching centers, and router subsystems to implement the backbone network. FIG. 1 is a block diagram of an exemplary fixed wireless communication system 100 in accordance with a preferred embodiment of the present invention. As depicted in FIG. 1, the communication system 100 includes a WLL subsystem, a microwave transport subsystem, and a backbone network coupling a wireless subsystem subscriber 101, 102 to the PSTN, the Internet 141, an interexchange carrier (IXC) 145, the emergency 911 subsystem, and/or ancillary telephony services, such as directory assistance 147 and operator services 149. The WLL subsystem comprises one or more base transceiver sites 104, 105 (two shown) and one or more stationary remote units 107, 108 (two shown). Each base transceiver site (BTS) 104, 105 and each remote unit (RU) 107, 108 includes a radio transceiver and an antenna system.

In accordance with known techniques, a remote unit (e.g., RU 107) receives wireless information (voice, data, and/or video) from its serving BTS 104 via radio signals communicated over a wireless resource 110, down-converts and demodulates the radio signals to extract the communicated information, and converts voice information into pulse code modulated (PCM) plain old telephone service (POTS) signals that can be conventionally processed by a WLL subsystem subscriber's telephone. Each BTS 104, 105 preferably serves RUs 107, 108 located within a two mile (approximately three (3) kilometer) radius of the respective BTS 104, 105. To transmit information, the RU 107 receives PCM or data signals from the subscriber's telephone, modulates and upconverts them in accordance with known techniques, and transmits the modulated signals to the serving BTS 104 over the wireless resource 110.

The WLL subsystem preferably comprises a frequency division multiple access system and the wireless resource 110 preferably comprises a frequency carrier in the Personal Communications Services (PCS) frequency band (approximately 1900 Megahertz (MHz)). Alternatively, the WLL subsystem may utilize any other access scheme, such as time division multiple access or code division multiple access, in which case the wireless resources 110, 111 comprise resources appropriate for the selected WLL subsystem access scheme (e.g., time slot or orthogonal code). Although the carrier frequencies of the wireless resources 110, 111 are preferably in the PCS band, the WLL subsystem of the present invention is not limited to such frequency range and may utilize any carrier frequencies allocated for general purpose radiotelephony or broadband use. The individual components of the WLL subsystem are well-known; thus, no further discussion of them will be presented.

The information received from the RU 107, 108 is forwarded by the BTS 104 via a point-to-point microwave link 116 to a microwave transceiver station (MTS) 114. A microwave transport is preferably used to link the WLL subsystem to the backbone network to eliminate the recurring costs of using LEC resources, such as leased telephone lines, to transport information between the WLL subsystem and the wireline backbone network. The preferred MTS 114 supports digital transmissions over the microwave link 116. The use of digital transmissions results in more efficient utilization of the microwave frequency spectrum, higher traffic carrying capacity of the link 116, substantial reduction in maintenance costs, greater reliability of the link 116, and, most importantly, higher quality audio than is provided over analog links.

In the preferred embodiment, the MTS 114 comprises an existing MTS and antenna tower leased, owned and/or operated by a cellular or PCS service provider. The microwave link 116 preferably provides service at least twenty-five miles (approximately forty (40) kilometers) from the location of the MTS 114.

Not every BTS 104, 105 need be within the coverage area of the MTS 114 to receive broadband service in accordance with the present invention. Rather, as depicted in FIG. 1, BTSs 104, 105 may be interconnected via a microwave link 112 within the WLL subsystem itself provided that microwave link 116 has the capacity (bandwidth) to support multiple BTSs 104, 105. For example, if the MTS 114 supported only one BTS 104, the capacity of microwave link 116 depends on the potential number of simultaneously operating subscribers and may need to be equivalent to the capacity of one or more DS1 wireline links (i.e., capable of supporting at least twenty-four (24) full duplex voice or data channels). Alternatively, if the MTS 114 supports more than one BTS 14, 105, the capacity of microwave link 116 may need to be increased to be equivalent to the capacity of a DS3 wireline link (i.e., capable of supporting up to twenty-eight (28) DS1 circuits). In the latter case, the capacity of the intra-WLL microwave link 112 depends on the potential number of simultaneously operating subscribers served by the particular BTS 105 and may need to be equivalent to the capacity of one or more DS1 wireline links.

The carrier frequency of both the intra-WLL microwave link 112 and the LEC bypass microwave link 116 is preferably six Gigahertz (6 GHz). In the case where an intra-WLL microwave link 112 is utilized, the distance between the linked BTSs 104, 105 depends on a variety of factors, such as antenna height and terrain, but is preferably in the three-to-fifteen mile (approximately five (5)-to-twenty-four (24) kilometer) range.

After the subscriber's transmission has been received and processed in accordance with known techniques by the MTS 114, the information (voice, data, or video) is forwarded into the backbone network. The backbone network preferably comprises one or more points of interface 118, 119 (two shown), one or more points of presence 120–123 (four shown), one or more regional switches 125 (one shown), and one or more router subsystems 127 (one shown). The points of interface (POIs) 118, 119 and the points of presence (POPs) 120–123 are well-known telephony system elements and are available from various telephone system manufacturers, such as AT&T, Lucent Technologies, Nortel, and Bellcore. The regional switch 125 preferably comprises a Class 5 switch that is commercially available from one or more of the aforementioned telephone system manufacturers. The router subsystem 127 is described in detail below with respect to FIG. 2. Transport of information within the backbone network and between the backbone network and the MTSs 114, the PSTN, the Internet, and the other telephony services preferably occurs over fiber optic cables. Alternatively, such backbone transport may occur over copper lines that support T1 and/or T3 transmissions.

The subscriber information received by the MTS 114 is preferably provided via a DS3 circuit to a POI 118. Alternatively, the information may be provided directly to a POP 120 over a DS3 circuit.

In the event that the information received by the MTS 114 and forwarded to POI 118 is voice information, the POI 118 forwards the information preferably via a DS1 circuit (or alternatively via a DS3 circuit) to the closest proximity POP 120. The POP 120 preferably serves as a hubbing point for the DS1 circuits. Hubbing is a process by which individual circuits or collections of circuits are compressed into a single higher rate circuit. In the preferred embodiment, transmission from the POI 118 to the POP 120 (and vice versa) occurs over DS1 leased circuits. As is known, each DS1 circuit supports up to twenty-four (24) full duplex voice or data channels. By contrast, transmission between POPs 120, 121 and from the POPs 121, 122 to the regional switching center 125 occurs over DS3 leased circuits. Each DS3 circuit can support up to twenty-eight (28) DS1 circuits. However, at any particular time, a DS3 circuit may not be carrying its full complement of DS1 circuits. Therefore, the POPs 120–123, inter alia, function as hubs to compress DS1 circuits into DS3 circuits that have available capacity, thereby reducing the number of DS3 circuits required at any particular time for transporting information over the backbone network. By reducing the number of DS3 circuits through hubbing, the present invention substantially reduces the cost of the backhaul transport without adversely affecting system performance.

After receiving voice information from the POI 118, the POP 120 compresses the DS1 circuits into higher rate DS3 circuits and forwards the information to the regional switch 125 via additional POPs 121 if necessary. The POPs 120–123 are distributed throughout the system 100 in accordance with known techniques based on several factors, including the availability of fiber optic lines and the proximity of the POPs 120–123 to the markets they serve. The regional switch 125 may be located either inside or outside an LATA 155, 157 that is currently involved in the call. In FIG. 1, the regional switch 125 is depicted as being outside the LATAs 155, 157 that may be involved in the call. Thus, the regional switch 125 serves multiple LATAs in contrast to prior art localized switches which serve only a single LATA. To expedite implementation of the preferred communication system 100, existing POIs 118, 119 and POPs 120–123 are utilized and appropriately coupled via fiber optic transmission lines to the MTS 114, the regional switch 125, and the router subsystem 127.

Upon receiving the information, the regional switch 125 forwards the call to the appropriate POP 121, 122 in accordance with a previously established switching path. Similar to conventional telephone call set-up procedures, prior to transmission of the voice information, the calling subscriber 101 dials the telephone number of the called subscriber.

Upon receiving such dialed digits from the subscriber 101 via the BTS 104, the MTS 114, the POI 118 (if used), and the POP(s) 120, 121, the regional switch 125 examines the telephone number and determines whether the target subscriber is a PSTN subscriber 133, 139 or a fixed wireless network subscriber (e.g., subscriber 102). The regional switch 125 preferably includes or is coupled to (e.g., via a dedicated or leased high speed line) one or more databases 126 identifying subscribers either as fixed wireless communication system subscribers or as PSTN subscribers. Thus, upon receiving the telephone number, the switch 125 accesses the databases 126 to determine where to route the call and establishes the fixed switching path for the call to proceed.

In the event that the target subscriber is a PSTN subscriber 133 located within the LATA 155 containing the originating WLL subsystem (i.e., an intra-LATA call), the regional switch 125 sends the information back to the originating POI 118 via the POP(s) 120, 121 for delivery to the PSTN access switch 129 in accordance with known Class 5 switching techniques. The PSTN access switch 129 then forwards the voice information to the appropriate PSTN end office 131 (typically a Class 5 switch) for final delivery to the PSTN subscriber 133.

In the event that the target subscriber is a PSTN subscriber 139 located within an LATA 157 that does not include the originating WLL subsystem (i.e., an inter-LATA call), the regional switch 125 forwards the call via appropriate POP(s) 122, 123 to the POI 119 (if used) providing access to the PSTN in the called LATA 157. The POI 119 forwards the call to the PSTN access switch 135, which in turn forwards the voice information to the appropriate PSTN end office 137 for final delivery to the PSTN subscriber 139.

In the event that the target subscriber is a WLL subscriber either within the LATA 155 containing the WLL subsystem or within another LATA, such as LATA 157 (e.g., when another WLL subsystem (not shown) is located in LATA 157 and is coupled to the backbone network via POI 119 and/or POP 123), the switch 125 routes the call through the POP(s) to the appropriate POI 118, 119. The POI 118, 119 then forwards the call to the MTS 114 for delivery to the subscriber 102 via the WLL subsystem. In this case, the call remains in the wireless subsystem(s) and backbone network, and never enters the PSTN (i.e., the call never passes through a PSTN access switch 129, 135).

In the event that the target of the voice information is the calling subscriber's long distance or interexchange carrier (IXC) 145, directory assistance (e.g., "411" was dialed), operator services (e.g., "0" was dialed), or the E911 subsystem (e.g., "911" was dialed), the regional switch 125 directs the voice information to the appropriate service provider preferably via DS1 circuits. In the case of an E911 call, the regional switch 125 provides the voice information to the E911 access switch 151 (typically an E911 tandem switch), which in turn routes the call to the public safety access point (PSAP) 153 for action by the E911 dispatcher in accordance with known techniques.

The present invention, as described above, utilizes regional switching to route calls to their appropriate locations. Since regional switching is used, every voice, data, or video transmission initiated by or intended for a fixed wireless communication system subscriber 101, 102 must be routed to the regional switch 125 before being forwarded to the appropriate PSTN access switch 129, 135, POP 120, 123, or POI 118, 119 for ultimate delivery to the target subscriber unit. In contrast to prior art telephone systems that utilize localized switching within each LATA, the present invention utilizes one regional switch to serve multiple LATAs and, therefore, substantially reduces system complexity and switch requirements. By using regional switches that each serve multiple LATAs and coupling the regional switches to the existing wireline infrastructure, the present invention facilitates rapid deployment of fixed wireless communication systems to serve new markets, such as low populous markets, and substantially reduces infrastructure costs (e.g., by reducing capital expenditures in each LATA).

When the information received from the MTS 114 is data information, the MTS 114 forwards the information to the POI 118 or POP 120. In this case, the POI 118 or POP 120 forwards the information to the router subsystem 127 instead of to the regional switch 125. The router subsystem 127 is preferably deployed on a regional basis together with the regional switch 125 and is the data counterpart to the regional switch 125. The router subsystem 127 routes the data either directly to an Internet backbone system 141 (e.g., when the operator of the fixed wireless network communication system 100 is also an Internet Service Provider (ISP)) or to an external ISP 143.

FIG. 2 is an electrical block diagram of the router subsystem 127 incorporated in the communication system 100 of FIG. 1. The router subsystem 127 preferably includes digital access cross-connect switches (DACS) 201, a node router 203, and a firewall/edge router 205. The DACS 201 is commercially available from Tellabs Operations, Inc. of Lisle, Ill. and the routers 203, 205 are commercially available from Cisco Systems, Inc. of San Jose, Calif. The router subsystem 127 is preferably collocated with the regional switch 125. The router subsystem 127 is equipped to allow the system operator to either become the subscriber's ISP or provide the system subscriber 101, 102 with access to the Internet via an external ISP 143, such as AT&T WorldNet.

The subscriber 101, 102 receives data services over the same wireless and microwave resources 110–112, 116 used to provide voice telephony service, thereby requiring no additional hardware at the RU or BTS locations. Data information from or for a subscriber 101, 102 is routed appropriately into or out of the DACS 201. The DACS 201 hubs data received from the subscribers 101, 102 (i.e., compresses received DS1 circuits into DS3 circuits) and routes the received data to the node router 203. The node router 203 provides connectivity to all subscriber data servers 207–212 and to the firewall/edge router 205 connected to an Internet backbone provider.

The services supported by the router subsystem 127 and the Internet access subsystem 141 include (a) basic ISP services, such as email 207, access to the Internet, access to news groups 209, access to file transfer protocol (FTP) sites 210, and network monitoring 212; (b) electronic commerce (E-commerce) solutions, such as web site electronic store support, electronic catalog services, and credit card processing and encryption services; (c) local content and web hosting services 208, such as domain name registration (via a domain name service (DNS) server 211), electronic mail forwarding, web site construction support, and custom web site design; and (d) virtual private network services, such as wide area network services, authentication, encryption, and firewall services, and dedicated Internet access support.

FIG. 3 is a logic flow diagram 300 of steps executed to select markets for employing fixed wireless communication systems in accordance with the present invention. The logic flow diagram 300 effectively comprises a method for selecting markets in which to provide fixed broadband (e.g., data rates greater than 128 kilobits per second (kbps)) wireless communication service, including voice, data, and video service. The communication networks with which such broadband service is provided preferably comprises fixed wireless communication systems, such as the system depicted in FIG. 1 and described in detail above.

The logic flow begins (301) when a first set of markets (or more generally geographic areas) are selected (303) in which the population is between the twentieth and the eightieth percentiles of regional (e.g., county) populations ranked in increasing order (generally known as lower tier markets). In the United States, this first set of markets includes counties with populations less than approximately 165,000 persons. In a preferred embodiment, the selection performed in block 303 is limited to selecting markets between the sixtieth and the eightieth percentiles of regional populations. Such markets correspond to Tier 2–4 markets, where each tier preferably corresponds to a respective tenth percentile of the regional populations ranked in increasing order. For example, the Tier 2 markets are the markets in which the population is in the eightieth percentile of regional populations ranked in increasing order; whereas, the Tier 4 markets are the markets in which the population is in the sixtieth percentile.

The logic flow continues when a second set of markets are selected (305) from the first set of markets, wherein the second set of markets have population centers within a predetermined distance (e.g., within seventy-five (75) miles or approximately one hundred twenty (120) kilometers) of population centers of regions (e.g., counties or equivalent government-established regions) having populations greater than the eightieth percentile of regional populations ranked in increasing order. In the preferred embodiment, the regions having populations greater than the eightieth percentile include counties with populations greater than 200,000 persons. It will be appreciated by those of ordinary skill in the art that the selection criterion of block 305 may result in the selection of markets that are in close proximity to other counties or equivalent government-established regions of greater economic activity than those with 200,000 people and may include the concomitant spill-over effects of such high economic activity regions.

The markets selected in block 305 are further reduced by selecting (307) markets of the second set in which the most-populated municipality or city is within a predetermined distance (preferably twenty-five miles or approximately forty (40) kilometers) of an existing microwave station or fiber point of presence (POP) to produce a third set of markets. In accordance with the preferred system configuration described above with respect to FIG. 1, the selection criterion of block 307 preferably selects markets for efficient utilization of existing backbone infrastructure.

The markets in the third set are preferably further filtered by selecting (309) markets in which the per capita personal income (PCPI) is greater than a defined threshold (e.g., $20,000) to produce a fourth set of markets. If the fourth set of markets is a reasonable number of markets in which to deploy or roll out the fixed wireless systems within a reasonable time period (e.g., three to five years), the desired markets for deploying the system have been identified and the logic flow ends (317).

If, however, the number of remaining markets is unreasonable for timely deployment, the quantity of markets may be further limited by executing one or more of blocks 311, 313, and 315 of the logic flow diagram 300. If the markets derived pursuant to block 309 need further revision for any of the above reasons, a fifth set of markets may be optionally selected (311) from the fourth set of markets, wherein the markets in the fifth set have household densities that are greater than a density threshold (e.g., 150 households per square kilometer). This criterion restricts the markets to more densely populated areas of the low populous regions and increases the potential subscriber base.

If further revision is still necessary, a sixth set of markets may be optionally selected (313) from the fifth set of markets, wherein the markets in the sixth set have a threshold number (e.g., three or more) of state roadways or federal highways passing through at least a portion of the markets. This criterion restricts the selected markets to those markets serving commuter communities (i.e., communities in which a substantial percentage of the employed inhabitants commute to more populous municipalities or counties for employment). Finally, if further restriction of the market set for deployment is necessary, the logic flow may continue by selecting (315) markets from the sixth set based on other factors, such as wireless frequency availability (or unavailability) and/or the presence (or lack thereof) of existing broadband competition in the markets. These criteria may be used to restrict the markets to those markets in which wireless spectrum is already available to support the WLL subsystem and/or microwave transport, and/or in which broadband competition is insubstantial.

The market selection methodology set forth in FIG. 3 and described above is preferably implemented by performing a simple query language (SQL) search in a commercially available market database, such as a geographic information systems (GIS) mapping software package, using at least the criteria recited in blocks 303–309 and optionally the criteria further recited in blocks 311–315. One such GIS mapping software package is the MAPINFO PROFESSIONAL software package that is commercially available from MapInfo Corporation of Troy, N.Y. Alternatively, the market selection methodology set forth in FIG. 3 may be implemented using any other comparable software algorithm that has access to the appropriate publicly available information, such as census information, PCPI information, MTS/POP location information, and other optional information used in the logic flow diagram 300 to select the markets. The market selection algorithm depicted in FIG. 3 preferably identifies lower tier markets that are currently lacking adequate service with respect to at least one of voice, data, and video services, and/or in which there is little or no competition among broadband service providers.

It will be appreciated by those of ordinary skill in the art that the market selection methodology described above with respect to FIG. 3 effectively comprises search criteria that would be preferably connected together with the Boolean operator "AND". That is, in the preferred embodiment, logic flow blocks 303–309 are implemented by producing a search string that includes the individual criterion from each block 303–309 "ANDed" together. If additional criteria is used to further limit the choice of markets (e.g., any of the optional criteria set forth in blocks 311–315), such additional criteria is preferably "ANDed" together with the original criteria. Therefore, although the logic flow diagram 300 depicts a preferred order for utilizing the identified criteria to select the desired markets, the criteria may be utilized in any manner or order so long as the listed criteria form the basis for selecting the markets.

The present invention encompasses a method for selecting geographic areas in which to deploy fixed wireless communication systems. Each of the fixed wireless communication systems to be deployed preferably includes a wireless subsystem connected via a microwave link to a backbone network comprising a particular arrangement of points of presence (POPs), points of interface (POIs), switching centers, and router subsystems that connect the wireless subsystem to the public switched telephone network (PSTN) and/or the Internet. The backbone arrangement preferably provides for hubbing/multiplexing to be performed in at least some of the POPs to provide an a economically efficient backhaul transport. In addition, the communication system preferably employs regional switching as opposed to localized switching to reduce wireline infrastructure costs and facilitate interconnection of other elements of the system to existing infrastructure, such as POPs and POIs. The present invention provides a set of market selection criteria for selecting optimal lower tier markets that are likely to provide sufficient subscriber support for such fixed wireless communication systems and that are preferably located in areas that facilitate rapid system deployment.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method for selecting geographic areas in which to deploy fixed wireless communication systems, the method comprising the steps of:

selecting a first set of geographic areas, wherein the first set geographic areas have populations that rank approximately between the twentieth and the eightieth percentile of regional populations ranked in increasing order;

selecting a second set of geographic areas from the first set of geographic areas, wherein the second set of geographic areas have population centers within respective predetermined distances of population centers of geographic areas that have populations greater than the eightieth percentile of regional populations ranked in increasing order;

selecting a third set of geographic areas from the second set of geographic areas, wherein a most-populated municipality of each geographic area of the third set of geographic areas is respectively located within a predetermined distance of at least one of an existing microwave transceiver site and an existing point of presence; and selecting a fourth set of geographic areas from the third set of geographic areas, wherein each geographic area of the fourth set of geographic areas has a per capita personal income greater than a threshold.

2. The method of claim 1, wherein the first set of geographic areas comprise geographic areas with populations less than or equal to approximately 165,000 persons.

3. The method of claim 1, wherein the respective predetermined distances of population centers of geographic areas that have populations greater than the eightieth percentile of regional populations ranked in increasing order comprise distances of less than or equal to approximately one hundred twenty kilometers.

4. The method of claim 1, wherein the predetermined distance of at least one of an existing microwave transceiver site and an existing point of presence comprises a distance of less than or equal to approximately forty kilometers.

5. The method of claim 1, wherein the threshold for per capita personal income is twenty thousand dollars.

6. The method of claim 1, further comprising the steps of:

determining whether a quantity of geographic areas in the fourth set is a reasonable quantity for deploying the fixed wireless communication systems within a predetermined time period; and in the event that the quantity of geographic areas in the fourth set is not a reasonable quantity for deploying the fixed wireless communication systems within a predetermined time period, selecting a fifth set of geographic areas from the fourth set of geographic areas, wherein each geographic area of the fifth set of geographic areas has a household density that is greater than a density threshold.

7. The method of claim 6, wherein the density threshold comprises one hundred fifty households per square kilometer.

8. The method of claim 6, further comprising the steps of:

determining whether a quantity of geographic areas in the fifth set is a reasonable quantity for deploying the fixed wireless communication systems within the predetermined time period; and in the event that the quantity of geographic areas in the fifth set is not a reasonable quantity for deploying the fixed wireless communication systems within the predetermined time period, selecting a sixth set of geographic areas from the fifth set of geographic areas, wherein each geographic area of the sixth set of geographic areas has at least a threshold number of at least one of state roadways and federal highways passing through at least a portion of such geographic area.

9. The method of claim 8, wherein the threshold number of at least one of state roadways and federal highways is three.

10. The method of claim 8, further comprising the steps of:

determining whether a quantity of geographic areas in the sixth set is a reasonable quantity for deploying the fixed wireless communication systems within the predetermined time period; and in the event that the quantity of geographic areas in the sixth set is not a reasonable quantity for deploying the fixed wireless communication systems within the predetermined time period, selecting at least a seventh set of geographic areas from the sixth set of geographic areas based on at least one of wireless frequency availability and a presence of existing broadband competition in the geographic areas of the sixth set.

11. The method of claim 1, further comprising the steps of:

determining whether a quantity of geographic areas in the fourth set is a reasonable quantity for deploying the fixed wireless communication systems within a predetermined time period; and in the event that the quantity of geographic areas in the fourth set is not a reasonable quantity for deploying the fixed wireless communication systems within a predetermined time period, selecting a fifth set of geographic areas from the fourth set of geographic areas, wherein each geographic area of the fifth set of geographic areas has at least a threshold number of at least one of state roadways and federal highways passing through at least a portion of such geographic area.

12. The method of claim 11, wherein the threshold number is three.

13. The method of claim 1, further comprising the steps of:
   determining whether a quantity of geographic areas in the fourth set is a reasonable quantity for deploying the fixed wireless communication systems within a predetermined time period; and
   in the event that the quantity of geographic areas in the fourth set is not a reasonable quantity for deploying the fixed wireless communication systems within a predetermined time period, selecting at least a fifth set of geographic areas from the fourth set of geographic areas based on at least one of wireless frequency availability and a presence of existing broadband competition in the geographic areas of the fourth set.

14. A method for selecting geographic areas in which to deploy fixed wireless communication systems, the method comprising the steps of:
   entering a first search criteria into a database which at least has access to census information, per capita personal income information, and information related to locations of microwave transceiver stations and points of presence, the first search criteria limiting a search in the database to geographic areas having populations that rank approximately between the twentieth and the eightieth percentiles of regional populations ranked in increasing order;
   entering a second search criteria into the database, the second search criteria limiting the search in the database to geographic areas having population centers within respective predetermined distances of population centers of geographic areas that have populations greater than the eightieth percentile of regional populations ranked in increasing order;
   entering a third search criteria into the database, the third search criteria limiting the search in the database to geographic areas having a respective most-populated municipality located within a predetermined distance of at least one of a microwave transceiver site and a point of presence;
   entering a fourth search criteria into the database, the fourth search criteria limiting the search in the database to geographic areas having a per capita personal income greater than a threshold; and
   executing the search in the database based on the first search criteria, the second search criteria, the third search criteria, and the fourth search criteria to select a set of geographic areas in which to deploy the fixed wireless communication systems.

15. The method of claim 14, wherein the geographic areas having populations that rank approximately between the twentieth and the eightieth percentiles of regional populations ranked in increasing order comprise geographic areas with populations less than or equal to approximately 165,000 persons.

16. The method of claim 14, wherein the respective predetermined distances of population centers of geographic areas that have populations greater than the eightieth percentile of regional populations ranked in increasing order comprise distances of less than or equal to approximately one hundred twenty kilometers.

17. The method of claim 14, wherein the predetermined distance of at least one of a microwave transceiver site and a point of presence comprises a distance of less than or equal to approximately forty kilometers.

18. The method of claim 14, wherein the threshold for per capita personal income is twenty thousand dollars.

19. The method of claim 14, further comprising the steps of:
   determining whether a quantity of geographic areas in the set of geographic areas resulting from executing the search is a reasonable quantity for deploying the fixed wireless communication systems within a predetermined time period;
   in the event that the quantity of geographic areas is not a reasonable quantity for deploying the fixed wireless communication systems within a predetermined time period,
      entering a fifth search criteria into the database, the fifth search criteria limiting a new search in the database to geographic areas having a household density that is greater than a density threshold; and
      executing the new search in the database based on the first search criteria, the second search criteria, the third search criteria, the fourth search criteria, and the fifth search criteria to select a new set of geographic areas in which to deploy the fixed wireless communication systems.

20. The method of claim 19, wherein the density threshold comprises one hundred fifty households per square kilometer.

21. The method of claim 14, further comprising the steps of:
   determining whether a quantity of geographic areas in the set of geographic areas resulting from executing the search is a reasonable quantity for deploying the fixed wireless communication systems within a predetermined time period;
   in the event that the quantity of geographic areas is not a reasonable quantity for deploying the fixed wireless communication systems within a predetermined time period,
      entering a fifth search criteria into the database, the fifth search criteria limiting a new search in the database to geographic areas having at least a threshold number of at least one of state roadways and federal highways passing through at least a portion of such geographic areas; and
      executing the new search in the database based on the first search criteria, the second search criteria, the third search criteria, the fourth search criteria, and the fifth search criteria to select a new set of geographic areas in which to deploy the fixed wireless communication systems.

22. The method of claim 21, wherein the threshold number of at least one of state roadways and federal highways is three.

23. The method of claim 14, further comprising the steps of:
   determining whether a quantity of geographic areas in the set of geographic areas resulting from executing the search is a reasonable quantity for deploying the fixed wireless communication systems within a predetermined time period;
   in the event that the quantity of geographic areas is not a reasonable quantity for deploying the fixed wireless communication systems within a predetermined time period, entering a fifth search criteria into the database, the fifth search criteria limiting a new search in the database based on at least one of wireless frequency availability and a presence of existing broadband competition in geographic areas of the set of geographic areas; and executing the new search in the database based on the first search criteria, the second search criteria, the third search criteria, the fourth search criteria, and the fifth search criteria to select a new set of geographic areas in which to deploy the fixed wireless communication systems.

24. The method of claim 14, wherein the search comprises a simple query language search.

25. The method of claim 14, wherein the database comprises a geographic information systems mapping software package.

* * * * *